United States Patent [19]

Yoshida et al.

[11] Patent Number: 4,563,272
[45] Date of Patent: Jan. 7, 1986

[54] DEMINERALIZER

[75] Inventors: Naoki Yoshida, Sagamihara; Hideo Goto, Koshigaya; Tomoaki Hayashi, Tokyo, all of Japan

[73] Assignee: Yamato Scientific Co., Ltd., Tokyo, Japan

[21] Appl. No.: 529,598

[22] Filed: Sep. 6, 1983

[30] Foreign Application Priority Data

Oct. 16, 1982 [JP] Japan .............................. 57-181771
Oct. 16, 1982 [JP] Japan .............................. 57-181775

[51] Int. Cl.⁴ .............................................. C02B 1/22
[52] U.S. Cl. .................................. 210/93; 210/96.1; 210/149
[58] Field of Search ............... 210/746, 742, 85, 93, 210/96.1, 149

[56] References Cited

U.S. PATENT DOCUMENTS 2,422,054  6/1947  Tiger ................................. 210/96.1
3,176,844  4/1965  Nelson .............................. 210/96.1
3,366,241  1/1968  McMorris ......................... 210/96.1

Primary Examiner—John Adee
Attorney, Agent, or Firm—Thomas & Kennedy

[57] ABSTRACT

A demineralizer for treatment of raw water through at least one pure water production unit. The demineralizer comprises a purity measuring meter for measuring a purity of water in downstream of the unit, a valve for preventing water to flow to next process of the treatment from the unit and a controlling unit for actuating the valve when measuring value of the meter is smaller than a desire value.

4 Claims, 3 Drawing Figures

DEMINERALIZER

BACKGROUND OF THE INVENTION

This invention pertains to a demineralizer which has improved the reliability of pure water produced.

In general, pure water is made mainly by any of the following three methods, namely, a distillation method, an ion exchange method, and a reverse osmosis method.

In the distillation method, raw water is boiled by heating and the resultant steam is cooled and condensed into pure water.

In the ion exchange method, raw water flows through the ion exchange resin and removed the resolved ionic substance, resulting in pure water. In the reverse osmosis method, raw water is filtered through a molecular level, using a special semipermeable membrane.

In the conventional pure water production devices, the pure water production units provided to treat raw water by any of the above three pure water production methods are used appropriately in two or more sets of combination according to the condition of water to be treated.

In these conventional pure water production devices, however, only the purity of pure water finally obtained is examined by its electric conductivity. If the result of this examination is lower than the predetermined purity level, the pure water is discarded. That is, when there is a pure water production unit which has exceeded the limit of damage orservice available in the raw water treatment process, no means of detecting such damage or service limit is available, making it impossible to immediately replace the unit. Consequently, such production of pure water that must be disused would be continued. As the result, pure water of a desired purity cannot be obtained, making it impossible to improve the reliability of the production unit.

SUMMARY OF THE INVENTION

An object of the invention is to provide a demineralizer which can exactly detect damage, etc. of each pure water production unit and obtain pure water of a desired purity, thereby improving the production system reliability.

DETAILED DESCRIPTION OF THE PREFERRED EMBODIMENT

Figure 1:
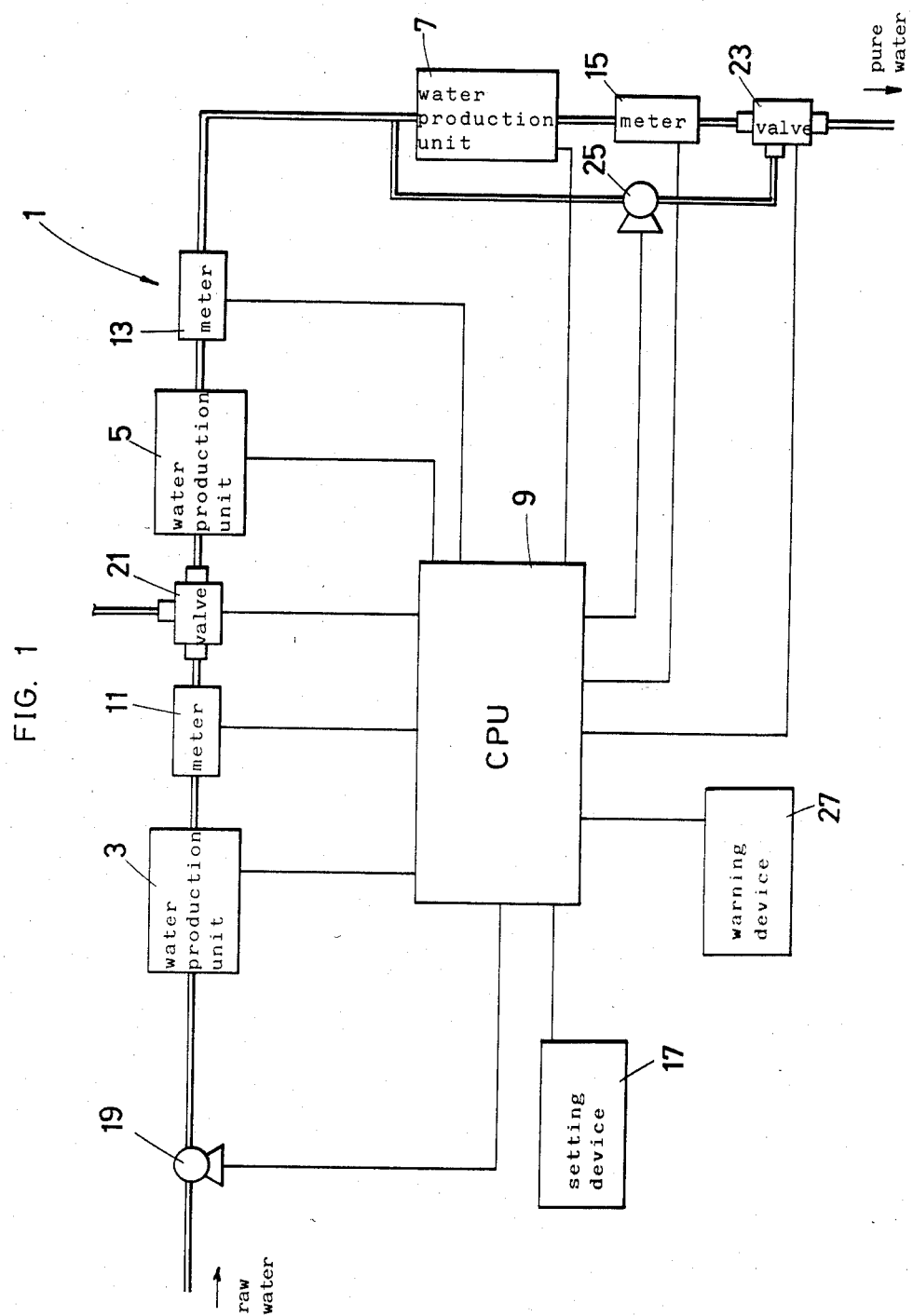
FIG. 1 is the block diagram indicating an application of the present invention.

Referring to FIG. 1, 1 indicates a demineralizer. The present demineralizer serves to produce pure water from raw water supplied by operating a feed pump 19 through a triplex process with the first, second, and third pure water production units 3, 5, and 7 set to perform the raw water treatment by any of the distillation, ion exchange and reverse osmosis methods, the above production process is controlled by microcomputer 9. That is, microcomputer 9 compares the results of purity measurement with the first, second and third electric conductivity meters provided in the output waterways of the pure water production units 3, 5, and 7 with the purity predetermined with a setting device 17. Then, according to the results of comparison, microcomputer 9 controls a raw water feed pump 19, first solenoid valve 21 to switch the output water from the first pure water production unit 3 onto the drain side, the second solenoid valve 23 and reflux motor 25 to make a reflux control of the treated water to the third pure water production unit 7 and abnormality warning device 27.

In the following paragraph, the performance of the pure water production process in the present application of the invention is explained with the functin of CPU (Entral Processing Unit) of microcomputer 9.

Generally, city water, for example, is available as raw water. Immediately after the water supply is started, various impurities in a city water pipe may sometimes enter raw water and it is impossible to produce pure water of a predetermined purity from such raw water. For this reason, after resetting the timer, CPU reads from the first electric conductivity meter 11 the purity of treated water in the first pure water production unit 3 with raw water supplied by feed pump 19. Then, the result ($U_1$) of measurement is compared with the present purity (Ux). If $U_1$ is larger than Ux, the first solenoid valve 21 should be switched to the WATER FEED side to feed water to the subsequent pure water production unit 5. If $U_1$ is smaller than Ux, the first solenoid valve 21 should be switched onto the DRAIN side, considering that production of pure water is impossible.

Immediately after the water supply is started, the draining is carried out through the pure water production unit 3 because of raw water contaminated with impurities in the city water pipe. Accordingly, CPU actuates the timer as soon as the draining of water begins. When the draining continues for a certain time (for example, 5 minutes), CPU stops the water feed pump 19. At the same time, CPU causes warning device 27 to inform the necessity of replacing the first pure water production unit and the drive section of the pure water production unit 1 is stopped.

When $U_1$ is determined to be smaller than Ux, the first solenoid valve 21 is switched onto the water feed side, then the purity $U_2$ of the output water supplied and treated in the second pure water production unit 5 is read on the second electric conductivity meter 13 and compared with the purity $U_1$ of raw water before treating in the second pure water production unit 5 to obtain the relative degree of purity improvement ($U_2/U_1$) with the present value Ur. If ($U_2/U_1$) is larger than Ur, it should be judged that the second pure water production unit 5 has been damaged or that its treatment capability has been deteriorated and the warning device 27 should be driven to inform the necessity of replacing the saif production unit 5 and the operation of the pure water production unit 1 should be stopped.

If the third pure water production unit 7, too, CPU actuates the warning device 27 and stops the operation of the demineralizer, if the purity $U_3$ read on the third electric conductivity meter 15 is in such a relationship that ($U_3/U_2$) is smaller than the present value $U_z$.

If ($U_3/U_2$) is larger than $U_z$, comparison should be made with the present desired purity $U_H$ of pure water. If $U_3$ is smaller than $U_H$, the second solenoid valve 23 should be set on circulating water path side and at the same time, circulation pump 25 should be driven to treat water again the third pure water production unit 7.

Figure 2:
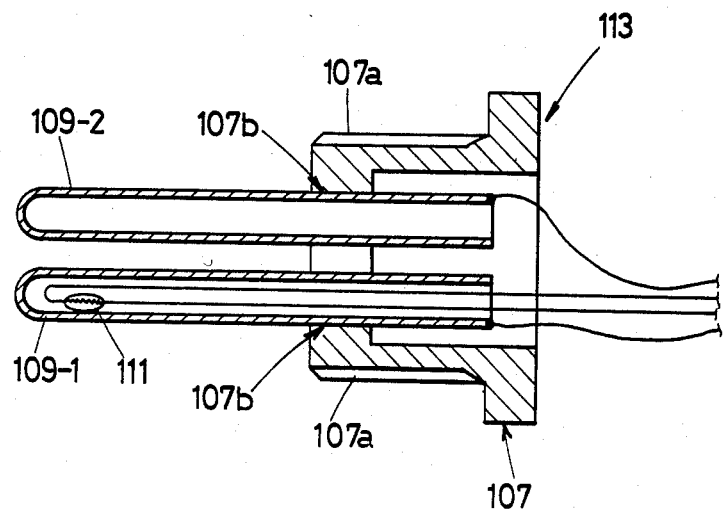
FIG. 2 is the sectional drawing of an electric conductivity meter.
Figure 3:
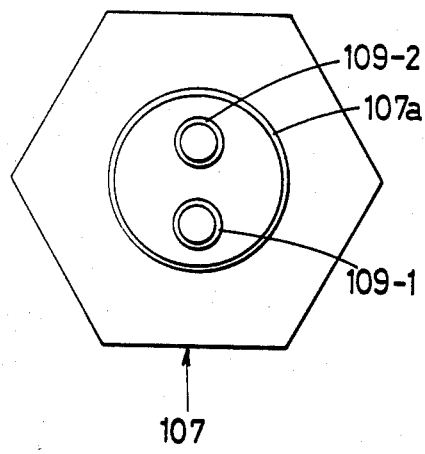
FIG. 3 is the front view of the electric conductivity meter shown in FIG. 2.

The structure of an electric conductivity meter is shown in FIG. 2.

This meter consists of the mount member 107 forming a mounting thread portion 107a in a pure water production unit, such electrodes 109-1 and 109-2 composed of narrow hollow conductors and inserted into a hole 107b formed in the mount member 107 to measure the electric conductivity of pure water, and temperature sensor 111 of platinum black, thermistor, etc. set in either of these electrodes, for example, electrode 109-1. Such metals low in the ionization tendency as gold, platinum, stainless steel, lead, nickel, tin, etc. are used as the composing materials of electrodes 109-1 and 109-2.

The method of measuring the electric conductivity of pure water with such an electric conductivity measuring sensor 13 composed as described above is similar to the conventional measuring method. In the electrode 109-1, however, temperature sensor 111 is set, allowing the electrode to be set only in one hole in the pure water production device. In addition, the pure water temperature surrounding electrode 109-1 can be measured accurately, making it possible to make a very correct temperature compensation for the measured values of the electric conductivity.

In the present application, raw water is treated in three pure water production units to produce pure water. However, it needs no saying that the quantity of pure water production units may be increased or decreased. Further in the present application, the water circulating path is provided only in the pure water production unit in the last stage of treatment. If the circulating water path is provided in each production unit, it can be assured that the purity of output water from each unit is equal to the present value for each production unit. Further, the purity of pure water obtained finally can be enhanced.

What is claimed is:

1. A demineralizer for the treatment of water comprising:
   a first pump;
   a first pure water production unit provided downstream from said first pump;
   a first meter provided downstream from said first pure water production unit for detecting the purity of water outputted from said first pure water production unit;
   a first valve provided downstream from said first meter and having an inlet port communicating with said first meter for receiving water therefrom, a drain port for discarding water of purity lower than a first prescribed value, and an outlet port for outputting water of purity higher than said first prescribed value;
   a second pure water production unit provided downstream from said first valve outlet port;
   a second meter provided downstream from second pure water production unit for detecting the purity of water outputted from said second pure water production unit;
   a second valve provided downstream from said second meter and having an inlet port for receiving water from said second meter, a by-pass port for outputting water of purity lower than a second prescribed value, and an outlet port for outputting water of purity higher than the second prescribed valve;
   a second pump provided on a by-pass conduit which communicates said by-pass port of said second valve with said inlet port of said second water production unit;
   a central processing unit for receiving purity information from said first and second meters and for controlling said first and second pumps and said first and second valves responsive to the purity information detected by said first and second meters;
   warning means for indicating an abnormal condition of the demineralizer according to an instruction of the central processing unit, and setting means by which said first and second prescribed values may be inputted into said central processing unit.

2. The demineralizer of claim 8 further comprising between said first valve and said second pure water production unit a third pure water production unit provided downstream from said first valve and a third meter provided downstream from said third pure water production unit.

3. The demineralizer of claim 1 wherein at least one of said meters has an electric conductivity measuring sensor comprising a pair of electrodes at least one of which is formed in a slender tube closed at one end and a temperature sensor positioned near the closed end of said tube.

4. The demineralizer of claim 3 wherein said electrodes comprise platinum black.

* * * * *